June 14, 1960 F. L. HAUSHALTER 2,940,785
BUSHING STRUCTURE

Filed Jan. 26, 1959 2 Sheets-Sheet 1

FRED L. HAUSHALTER
INVENTOR.

BY
Whittemore, Hulbert & Belknap
ATTORNEYS

June 14, 1960  F. L. HAUSHALTER  2,940,785
BUSHING STRUCTURE
Filed Jan. 26, 1959  2 Sheets-Sheet 2

INVENTOR
FRED L. HAUSHALTER

BY Whittemore, Hulbert & Belknap
ATTORNEYS

2,940,785

BUSHING STRUCTURE

Fred L. Haushalter, 2185 Scott Lake Road, Pontiac, Mich.

Filed Jan. 26, 1959, Ser. No. 789,183

7 Claims. (Cl. 287—85)

This invention pertains to resilient bushings of the type interposed between a pair of relatively rotatable members having radially spaced concentric surfaces. Bushings of this type employ a yieldable tubular element, usually formed of rubber or rubber-like material, positioned between and in intimate contact with inner and outer metal sleeves. In particular, this invention provides means for inserting the rubber element into the space between the metal sleeves. It also provides structure designed to take up end thrust to which the bushing is subjected under ordinary operating conditions.

It is one of the objects of this invention to provide contiguously disposed metal tubular elements or annuluses adapted to cooperate with annular recesses in a rubber element for the purpose of pressing the element into an annular space between radially spaced cylindrical sleeves.

It is another object of the invention to provide a pair of interfitting metal tubular elements for the foregoing purpose and which, when in assembled relation with the completed bushing, will permit relative rotation between these tubular elements.

It is a further object of the invention to provide on a shaft, bolt, or the like, adjustable abutment means designed to bear against the bushing to resist end thrust to which the bushing is subjected.

Other objects will be apparent from the following description of the invention taken with the accompanying drawings, in which.

Figure 3:
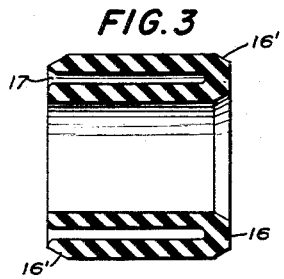
Fig. 3 is a section through one embodiment of the rubber element of the bushing in its initial form and prior to its assembly with other parts thereof.

In the several embodiments of the invention shown in the drawings, it will be seen that a round shaft or the like, such, for instance, as a bolt, is indicated at 11, the shaft having a reduced portion 12 and shoulder 20 thereon. Surrounding the shaft is a shock or vibration damper 13. The principal parts of the damper are the concentric inner metal sleeve 14, outer metal sleeve 15, and an interposed tubular resilient element 16, the latter being in intimate frictional contact with both of the metal sleeves. It will be seen that the axial length of the outer sleeve 15 is less than that of the inner sleeve 14. In its initial form, the resilient element 16, molded from rubber or similar material, comprises a generally tubular component having an annular recess 17 extending axially a substantial distance therethrough. The radial thickness of the wall of this component is somewhat greater than the space between concentric sleeves 14, 15. In order to introduce the resilient element 16 into the space between the metal sleeves, a pair of metal tubes 18, 19 having appropriate diameters such that one fits snugly within the other and that both fit within the recess 17, are forced by a suitable tool (not shown) exerting pressure on the left end of the nested tubes 18, 19 to stretch the rubber element 16 along the surfaces of sleeves 14 and 15. The thickness of the rubber element 16 is thus reduced and placed under tension. When pressure on the tubes is terminated, the tendency of the rubber element 16 to return to its initial form effects an intimate frictional engagement of the rubber with the inner and outer sleeves 14 and 15 of the assembled bushing. At the same time, the tubular metal inserts are also intimately engaged by the rubber so that, in effect, the inserts are embedded in the rubber. As shown in Fig. 3 the ends of the resilient element 16 are chamfered at 16' to facilitate initial insertion of said resilient element between the sleeves 14, 15.

Figure 1:
Fig. 1 is a fragmentary section of one form of an assembled bushing showing a pair of cylindrical metal inserts.
Figure 2:
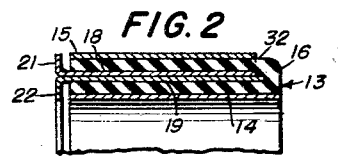
Fig. 2 is a fragmentary section of a similar type of bushing in which the metal inserts are of a modified form.
Figure 6:
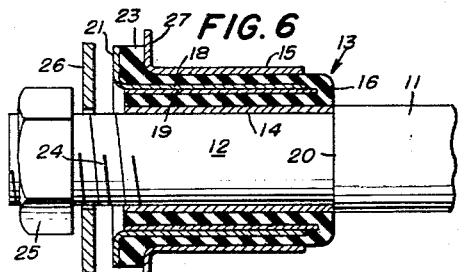
Fig. 6 is a section through the bushing as applied to a shaft, together with adjustable abutment means before the latter are drawn into abutting relation with the bushing.
Figure 7:
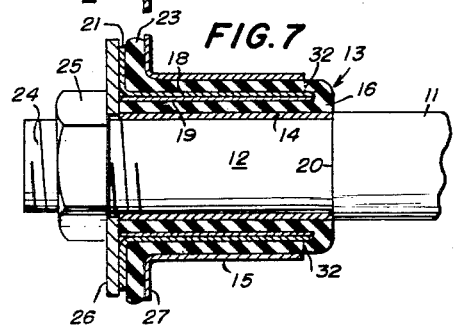
Fig. 7 is a section similar to Fig. 6 with the abutment drawn into abutting relation with the bushing.

In Fig. 1 the metal tubes 18 and 19 employed for introducing the rubber component 16 into the bushing have no end flanges whatever, while those illustrated in Fig. 2 are provided with radially extending end flanges 21, 22. In either type the metal tubes 18, 19 are snugly interfitting, one within the other, but their contiguous surfaces are smooth so that one of the tubes may be rotated relative to the other. In Figs. 6 and 7, the outer metal tube 18 has a radially extending end flange 21, and the outer metal sleeve 15 has a radially extending end flange 27. Such flanges 21 and 27 are disposed in spaced substantially parallel relation and receive therebetween an enlarged radially extending end portion 23 of the rubber component 16.

In several of the figures the shaft 12, or its equivalent, is threaded at 24 to accommodate nut 25, and a washer or plate 26 is disposed between the nut and the assembled bushing. By turning the nut 25, the washer 26 is forced into abutting relation with the bushing. Where one of the metal tubes or inserts employed for introducing the rubber into the bushing is flanged, as in Figs. 6 and 7, the washer 26 bears against the flange 21 which, in turn, presses against the enlarged end portion 23 of the resilient component 16 to distort and compress said enlarged end portion 23 against the flange 27. Preferably, the flanges 21, 27 and washer 26 have approximately equal diameters. Thus, any end thrust on the bushing is effectively resisted. The inner sleeve 14 of the bushing, which fits the reduced portion 12, bears against shoulder 20 which prevents axial movement of the bushing toward the right in the several views.

Figure 8:
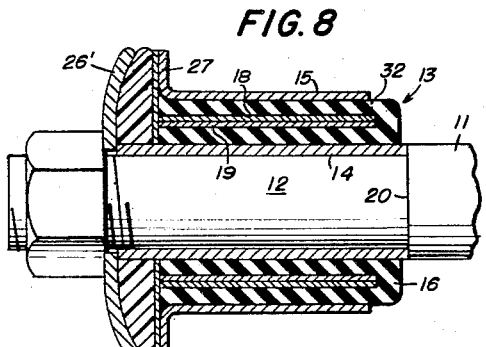
Fig. 8 is a section through a modified embodiment of the invention.

In Fig. 8, wherein the insert metal tubes 18, 19 are of uniform diameter, the washer 26' is dished and a second washer 28 bears against flange 27 of outer sleeve 15 and the ends of metal tubes 18, 19. There is also interposed between washers 26', 28 a third washer-like element 29 formed from a plastic material, the combination of the several washers forming a unit capable of being drawn tightly against the flanged outer sleeve and the resilient part of the bushing to resist end thrust.

Figure 10:
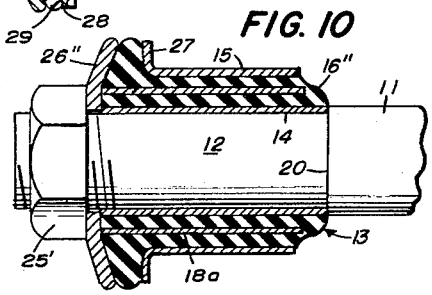
Figs. 9 and 10 are sections of still another modified form of the invention, these views illustrating, respectively, the end thrust abutment before and after it has been drawn into abutting relation with the bushing.
Figure 9:
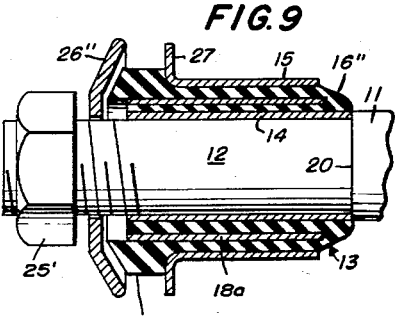
Figure 4:
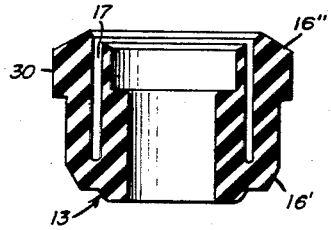
Figs. 4 and 5 are sections through other initial forms of rubber elements employed in the bushing.
Figure 5:
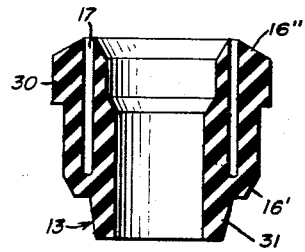

The bushings shown in Figs. 9 and 10 include resilient inserts 16″ of the type disclosed in Figs. 4 and 5, there being an enlarged radially protruding portion 30 at one end of the part and a reduced portion 31 at the other end thereof. As is the case with the other embodiments of the invention previously described, the rubber element 16″ is introduced into the space between the inner and outer sleeves 14, 15 by pressure exerted against the metal insert 18a to force the rubber and place it under tension. The enlarged portion 30 of the rubber element 16″ is disposed between washer 26″ and flange 27 of the outer metal sleeve 15, and when the washer 26″ is forced against the rubber by threading the nut 25′ toward the bushing, the portion 30 will be distorted so as to enlarge its diameter, as shown in Fig. 10, so that its diameter, when so distorted, is approximately that of the washer 26″ and the flange 27 on the outer sleeve 15 of the bushing.

After the rubber element 16, or the element 16″ in its modified forms, has been stretched and forced between the inner and outer sleeves 14, 15, it may be desirable, although not always necessary, to cut through the rubber adjacent the end of the outer sleeve to the metal insert, as indicated at 32. The purpose of so cutting the rubber is to eliminate torsional resistance in the end portion of the rubber element connecting the inner and outer sections of the rubber should one of the pair of metal inserts 18, 19 rotate relative to the other insert. Where this relative rotation is not extensive or where such torsional resistance may have certain advantages, the step of cutting the rubber is omitted. It will be appreciated that because the metal inserts 18, 19 may rotate with respect to each other, much of the torsional resistance in the total length of the rubber element will be greatly reduced, the inner and outer sections of the rubber element being separated over the greater portion of the element and thus free to rotate with respect to each other.

Figure 11:
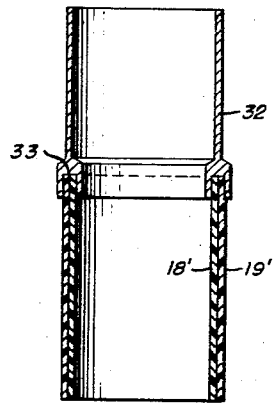
Fig. 11 is a sectional view of a pair of inserts formed from a rigid plastic material, together with a tool employed to force the inserts into a rubber bushing.

In Fig. 11 the tubular insert members 18′, 19′ are formed from plastic and are sufficiently rigid to force a resilient element such as 16 or 16″ into the space between concentric sleeves such as 14 and 15. A suitable metal forcing tool 32 having an annular groove 33 is adapted to engage the ends of the nested plastic members 18′, 19′ so that when pressure is applied to the tool 32 the plastic members 18′, 19′ will be forced into a recess such as 17 in the resilient element, and in turn will force the resilient element into the space between a pair of metal sleeves such as 14 and 15. For some purposes, plastic inserts may be more desirable than those formed from metal, and it is, therefore, within the contemplated embodiments of the invention to employ tubular inserts formed from plastic.

Figure 12:
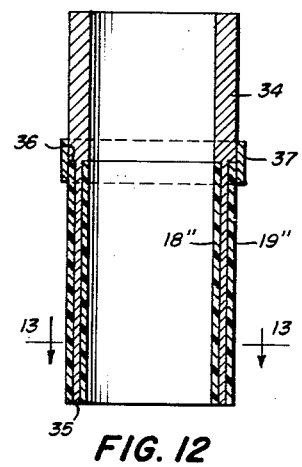
Fig. 12 is a sectional view of a pair of plastic inserts illustrating another form of forcing tool.
Figure 13:
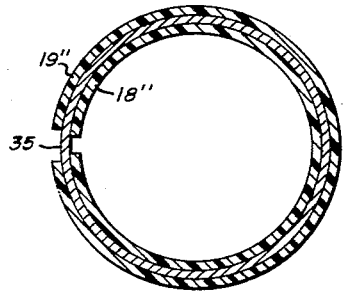
Fig. 13 is a transverse section taken on line 13—13 of Fig. 12.

Figs. 12 and 13 illustrate a modified form of forcing tool 34 in which a thin elongated extension 35 of the metal tool extends axially from shoulders 36. These shoulders engage the ends of plastic members 18″, 19″ between which the extension 35 is disposed prior to and during the forcing operation. The insert members 18″, 19″ may be split longitudinally, as shown in Fig. 13, the inner member 18″ being contracted within the extension 35, and the outer member 19″ being held to the tool by band 37. When the tool is withdrawn after insertion of the plastic members 18″, 19″, the inner member 18″ will expand into contiguous relation with member 19″.

Several embodiments have been illustrated and described, but other modifications of the invention are intended to be included in the broader aspects thereof as defined in the appended claims.

I claim:
1. In combination with a cylindrical body, a bushing structure on said body comprising an inner metal sleeve fitting said body, an outer metal sleeve spaced radially from and concentric with said inner metal sleeve, a tubular resilient element disposed in the space between said sleeves, rigid tubular annulus means embedded in said resilient element, said element being in intimate engagement with said sleeves and said annulus means, means on said body cooperating with said inner sleeve to prevent axial movement of said bushing in a direction away from one end of said body, and adjustable abutment means on said one end exerting pressure on the bushing in said direction to resist thrusts toward said one end.

2. The combination defined in claim 1 in which the adjustable abutment means includes an adjustable washer encircling said body adjacent an end of said bushing, the outer sleeve is provided with a flange extending radially outwardly therefrom, and the diameters of said flange and said washer are approximately equal.

3. The combination defined in claim 2 in which the diameter of one end of the resilient element is greater than that of the outer sleeve and is disposed between said washer and said flange.

4. The combination defined in claim 2 in which plastic means are interposed between said washer and said flange.

5. The combination defined in claim 1 in which the annulus means comprises a pair of snugly interfitting tubular inserts, said inserts being relatively rotatable with respect to each other.

6. A bushing structure for interposition between relatively rotatable members, comprising radially spaced inner and outer concentric sleeves, a tubular resilient element disposed in the space between said sleeves, and a pair of rigid tubular annuluses embedded within said resilient element, said annuluses closely interfitting each other and being concentric with the sleeves aforesaid, said annuluses being relatively rotatable with respect to each other, an annular portion of said resilient element being disposed between and in intimate engagement with said outer sleeve and one of said annuluses, another annular portion of said resilient element being disposed between and in intimate engagement with said inner sleeve and the other of said annuluses and separated from the first mentioned annular portion of said resilient element.

7. In combination with an elongated body, a bushing structure on said body comprising an inner metal sleeve fitting said body, an outer metal sleeve spaced radially from and concentric with said inner metal sleeve, a tubular resilient element disposed in the space between said sleeves, a pair of rigid tubular annuluses embedded within said resilient element, said annuluses closely interfitting each other and being concentric with the sleeves aforesaid, said annuluses being relatively rotatable with respect to each other, an annular portion of said resilient element being disposed between and in intimate engagement with said outer sleeve and one of said rigid tubular annuluses, another annular portion of said resilient element being disposed between and in intimate engagement with said inner sleeve and the other of said annuluses, means on said body cooperating with said inner sleeve to prevent axial movement of said bushing in a direction away from one end of said body, and adjustable abutment means on said one end exerting pressure on the bushing in said direction to resist thrusts toward said one end.

References Cited in the file of this patent
UNITED STATES PATENTS

| | | |
|---|---|---|
| 1,916,077 | Schlatter | June 27, 1933 |
| 2,051,864 | Knox et al. | Aug. 25, 1936 |
| 2,095,947 | Herold | Oct. 12, 1937 |
| 2,126,707 | Schmidt | Aug. 16, 1938 |
| 2,165,702 | Haushalter | July 11, 1939 |
| 2,305,732 | Piron | Dec. 22, 1942 |
| 2,346,574 | Guy | Apr. 11, 1944 |
| 2,787,486 | Thiry | Apr. 2, 1957 |